(12) United States Patent
Furuta

(10) Patent No.: US 9,939,712 B2
(45) Date of Patent: Apr. 10, 2018

(54) IMAGING APPARATUS, FLICKER DETECTION METHOD, AND FLICKER DETECTION PROGRAM

(71) Applicant: FUJIFILM Corporation, Tokyo (JP)

(72) Inventor: Yoshinori Furuta, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/677,468

(22) Filed: Aug. 15, 2017

(65) Prior Publication Data

US 2017/0343882 A1    Nov. 30, 2017

Related U.S. Application Data

(63) Continuation of application No. PCT/JP2015/082445, filed on Nov. 18, 2015.

(30) Foreign Application Priority Data

Feb. 16, 2015 (JP) .................................. 2015-027594

(51) Int. Cl.
*H04N 9/73* (2006.01)
*G03B 7/093* (2006.01)
(Continued)

(52) U.S. Cl.
CPC ............. *G03B 7/093* (2013.01); *H04N 5/351* (2013.01); *H04N 5/3745* (2013.01)

(58) Field of Classification Search
CPC ....... G03B 7/093; H04N 5/351; H04N 5/3745
(Continued)

(56) References Cited

U.S. PATENT DOCUMENTS

2008/0049132 A1* 2/2008 Suzuki ............... H04N 5/23293
  348/308
2010/0123810 A1* 5/2010 Greenland ............. G03B 19/18
  348/294

(Continued)

FOREIGN PATENT DOCUMENTS

JP    2007-329658 A    12/2007
JP    2008-109253 A     5/2008
(Continued)

OTHER PUBLICATIONS

English translation of International Search Report, issued in PCT/JP2015/082445, dated Jan. 19, 2016 (Form PCT/ISA/210).
(Continued)

*Primary Examiner* — Sinh Tran
*Assistant Examiner* — Zhenzhen Wu
(74) *Attorney, Agent, or Firm* — Birch, Stewart, Kolasch & Birch, LLP

(57) ABSTRACT

Provided are an imaging apparatus, a flicker detection method, and a flicker detection program that can accurately detect a flicker even in a case in which an image of a bright object is captured. A digital camera directs a MOS imaging element 5 to perform a plurality of imaging operations at an arbitrary frame rate and compares captured image signals which are read from the imaging element 5 for frame periods F1 and F2 based on the frame rate to detect whether a flicker has occurred. The end time of a signal reading period in the frame period F1 is before the end time of the frame period F1 and the end time of a signal reading period in the frame period F2 coincides with the end time of the frame period F2.

23 Claims, 9 Drawing Sheets

(51) Int. Cl.
  *H04N 5/351*   (2011.01)
  *H04N 5/3745*  (2011.01)
(58) Field of Classification Search
  USPC ........................................... 348/226.1
  See application file for complete search history.

(56) References Cited

U.S. PATENT DOCUMENTS

| | | | | |
|---|---|---|---|---|
| 2012/0002074 A1* | 1/2012 | Baba | ................. | H04N 5/235 |
| | | | | 348/228.1 |
| 2012/0081569 A1* | 4/2012 | Yost | ................. | H04N 5/2353 |
| | | | | 348/226.1 |
| 2012/0154629 A1* | 6/2012 | Horiuchi | ............. | H04N 7/0127 |
| | | | | 348/226.1 |
| 2014/0375848 A1 | 12/2014 | Yamamoto et al. | | |

FOREIGN PATENT DOCUMENTS

| | | |
|---|---|---|
| JP | 2010-98416 A | 4/2010 |
| JP | 2011-176622 A | 9/2011 |
| JP | 2013-121099 A | 6/2013 |
| WO | 2008/108025 A1 | 9/2008 |

OTHER PUBLICATIONS

English translation of Written Opinion of the International Searching Authority issued in PCT/JP2015/082445, dated Jan. 19, 2016 (Form PCT/ISA/237).

* cited by examiner

IMAGING APPARATUS, FLICKER DETECTION METHOD, AND FLICKER DETECTION PROGRAM

CROSS REFERENCE TO RELATED APPLICATION

This is a continuation of International Application No. PCT/JP2015/082445 filed on Nov. 18, 2015, and claims priority from Japanese Patent Application No. 2015-027594 filed on Feb. 16, 2015, the entire disclosures of which are incorporated herein by reference.

BACKGROUND OF THE INVENTION

1. Field of the Invention

The present invention relates to an imaging apparatus, a flicker detection method, and a computer readable medium storing a flicker detection program.

2. Description of the Related Art

An imaging apparatus comprising a general XY-address-scanning-type imaging element uses a rolling shutter method that controls a charge accumulation time for each scanning line of pixels, using address designation. In the specification, information apparatuses with an imaging function, such as a digital still camera, a digital video camera, and a smart phone, are referred to as imaging apparatuses.

In a case in which a motion picture is captured by the rolling shutter method under a fluorescent lamp, uneven horizontal stripes (hereinafter, referred to as a "flicker") are likely to be generated in the captured image by the influence of a periodical change in brightness caused by the flicker cycle (for example, $1/100$ seconds or $1/120$ seconds in the case of a commercial power supply with a frequency 50 hertz (Hz) or 60 Hz) of a light source of the fluorescent lamp.

WO2008/108025A, JP2011-176622A, and JP2007-329658A disclose a method that detects whether a flicker has occurred.

WO2008/108025A discloses an imaging apparatus that detects a flicker, using difference image data between captured image data obtained at the exposure time when no flicker occurs and captured image data obtained at the exposure time when a flicker occurs.

JP2011-176622A and JP2007-329658A disclose an imaging apparatus that detects whether a flicker has occurred on the basis of the difference between captured image data obtained at the exposure time that is set to a natural number multiple of $1/100$ seconds and captured image data obtained at the exposure time that is set to a natural number multiple of $1/120$ seconds.

SUMMARY OF THE INVENTION

In the imaging apparatus disclosed in WO2008/108025A, in a situation in which an object is very bright, halation occurs in the entire captured image data obtained at the exposure time when no flicker occurs and it is difficult to accurately detect the occurrence of a flicker from the difference image data between two captured image data items.

In the imaging apparatus disclosed in JP2011-176622A and JP2007-329658A, in a situation in which an object is very bright, when the exposure time is set to a natural number multiple of $1/100$ seconds or a natural number multiple of $1/120$ seconds, halation occurs in the entire captured image data obtained at each exposure time and it is difficult to accurately detect a flicker.

The invention has been made in view of the above-mentioned problems and object of the invention is to provide an imaging apparatus, a flicker detection method, and a computer readable medium storing a flicker detection program that can accurately detect a flicker even in a case in which an image of a bright object is captured.

An imaging apparatus according to the invention comprises: a MOS imaging element that includes a plurality of pixels which are two-dimensionally arranged; an imaging element driving unit that drives the imaging element using a rolling shutter method such that the imaging element performs a plurality of imaging operations at an arbitrary frame rate; and a flicker detection unit that compares a first captured image signal which is read from the plurality of pixels for a first frame period based on the frame rate with a second captured image signal which is read from the plurality of pixels for a second frame period based on the frame rate to detect whether a flicker has occurred. The imaging element driving unit performs the driving such that an end time of a signal reading period for which a signal is read from the plurality of pixels in the first frame period is before an end time of the first frame period and an end time of a signal reading period for which a signal is read from the plurality of pixels in the second frame period coincides with an end time of the second frame period.

A flicker detection method according to the invention comprises: an imaging element driving step of driving a MOS imaging element including a plurality of pixels which are two-dimensionally arranged, using a rolling shutter method, such that the imaging element performs a plurality of imaging operations at an arbitrary frame rate; and a flicker detection step of comparing a first captured image signal which is read from the plurality of pixels for a first frame period based on the frame rate with a second captured image signal which is read from the plurality of pixels for a second frame period based on the frame rate to detect whether a flicker has occurred. In the imaging element driving step, the driving is performed such that an end time of a signal reading period for which a signal is read from the plurality of pixels in the first frame period is before an end time of the first frame period and an end time of a signal reading period for which a signal is read from the plurality of pixels in the second frame period coincides with an end time of the second frame period.

A flicker detection program according to the invention causes a computer to perform: an imaging element driving step of driving a MOS imaging element including a plurality of pixels which are two-dimensionally arranged, using a rolling shutter method, such that the imaging element performs a plurality of imaging operations at an arbitrary frame rate; and a flicker detection step of comparing a first captured image signal which is read from the plurality of pixels for a first frame period based on the frame rate with a second captured image signal which is read from the plurality of pixels for a second frame period based on the frame rate to detect whether a flicker has occurred. In the imaging element driving step, the driving is performed such that an end time of a signal reading period for which a signal is read from the plurality of pixels in the first frame period is before an end time of the first frame period and an end time of a signal reading period for which a signal is read from the plurality of pixels in the second frame period coincides with an end time of the second frame period.

According to the invention, it is possible to provide an imaging apparatus, a flicker detection method, and a flicker detection program that can accurately detect a flicker even in a case in which an image of a bright object is captured.

DESCRIPTION OF THE PREFERRED EMBODIMENTS

Hereinafter, an embodiment of the invention will be described with reference to the drawings.

Figure 1:
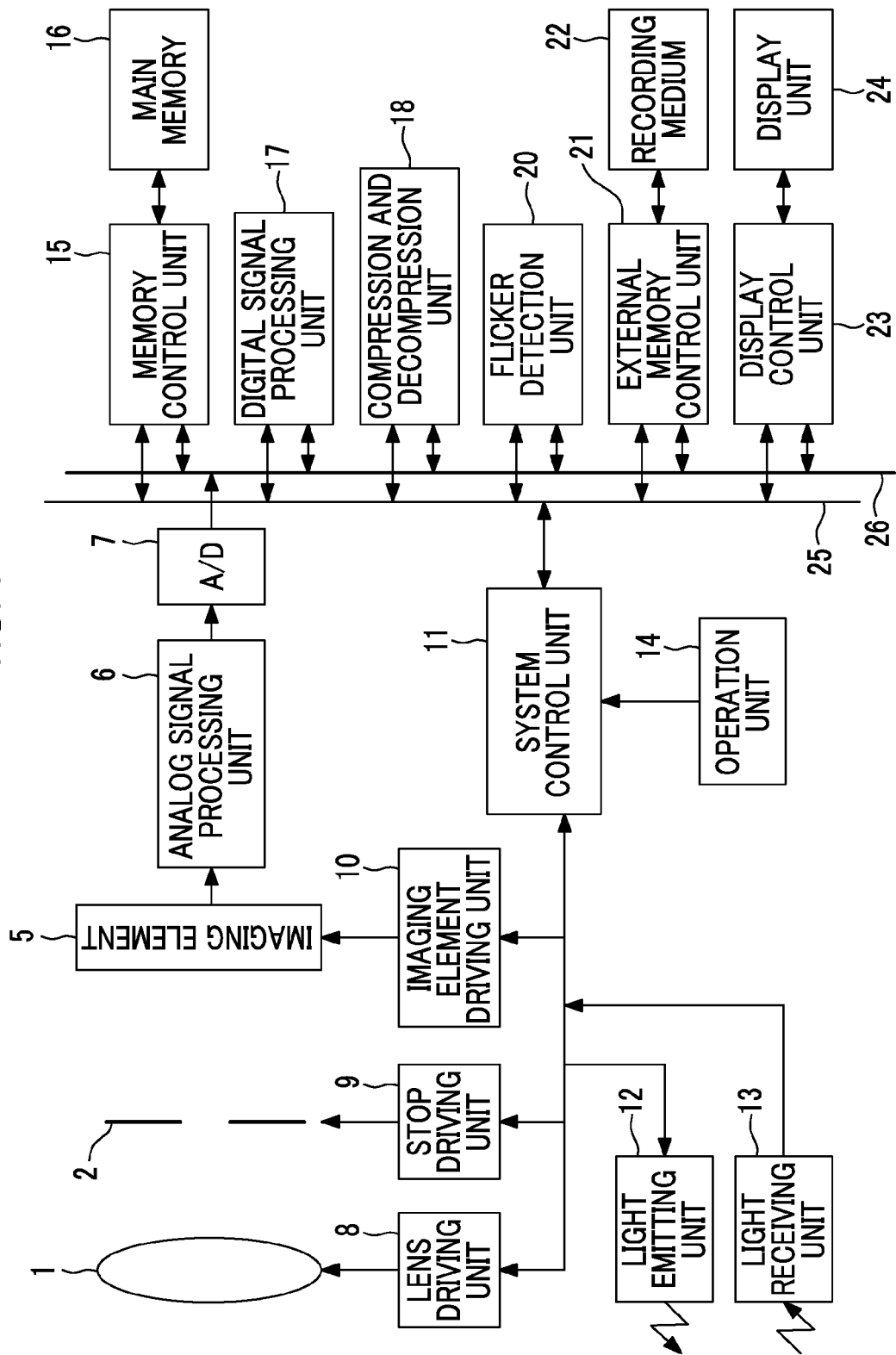
FIG. 1 is a diagram schematically illustrating the structure of a digital camera as an example of an imaging apparatus for describing an embodiment of the invention.

FIG. 1 is a diagram schematically illustrating the structure of a digital camera as an example of an imaging apparatus for describing an embodiment of the invention.

An imaging system of the digital camera illustrated in FIG. 1 comprises an imaging optical system (including an imaging lens 1 and a stop 2) and an imaging element 5.

The imaging element 5 is a metal-oxide semiconductor (MOS) imaging element in which a plurality of pixels are two-dimensionally arranged and a signal can be read from an arbitrary pixel by the designation of an XY address.

A system control unit 11 that controls the overall operation of the entire electric control system of the digital camera controls a light emitting unit 12 and a light receiving unit 13. In addition, the system control unit 11 controls a lens driving unit 8 such that the position of, for example, a focus lens included in the imaging lens 1 is adjusted. Further, the system control unit 11 controls the amount of opening of the stop 2 through a stop driving unit 9 to adjust the amount of exposure.

The system control unit 11 drives the imaging element 5 through an imaging element driving unit 10 such that an object image captured through the imaging lens 1 is output as captured image signal. A command signal is input from a user to the system control unit 11 through an operation unit 14. The captured image signal includes a plurality of pixel signals which are two-dimensionally arranged in the X direction and the Y direction perpendicular to the X direction.

The imaging element driving unit 10 drives the imaging element 5 using a rolling shutter method. The rolling shutter method is a method that sequentially performs an exposure operation for one or more scanning lines (each line including a plurality of pixels arranged in the horizontal direction) that are arranged in the vertical direction in a MOS imaging element.

That is, the rolling shutter method is a method that sequentially resets the scanning lines, accumulates charge in each pixel of each scanning line, reads a signal from each scanning line, and sequentially reads the charge accumulated in each pixel (which is also referred to as a focal-plane shutter method).

At the time of a flicker detection operation which will be described below, the imaging element driving unit 10 directs the imaging element 5 to perform a plurality of imaging operations at an arbitrary frame rate set by the system control unit 11. The frame rate is a value indicating the number of frames (captured image signals) output from the imaging element 5 per unit time.

When the frame rate is, for example, 120 frames/second, the period from a falling edge to the next falling edge of a vertical synchronizing signal of a display unit 24 which will be described below is $1/120$ seconds. In addition, the period from a falling edge to the next falling edge of a vertical synchronizing signal used to drive the imaging element 5 is $1/120$ seconds.

The electric control system of the digital camera further comprises an analog signal processing unit 6 that is connected to the output of the imaging element 5 and performs analog signal processing, such as a correlated double sampling process, and an analog/digital (A/D) conversion circuit 7 that converts an analog signal output from the analog signal processing unit 6 into a digital signal. The analog signal processing unit 6 and the analog/digital conversion circuit 7 are controlled by the system control unit 11.

In addition, the electric control system of the digital camera comprises a main memory 16, a memory control unit 15 that is connected to the main memory 16, a digital signal processing unit 17 that performs, for example, an interpolation operation, a gamma correction operation, and an RGB-YC conversion process for the captured image signal output from the analog/digital conversion circuit 7 to generate captured image data, a compression and decompression processing unit 18 that compresses the captured image data generated by the digital signal processing unit 17 in a Joint Photographic Experts Group (JPEG) format or decompresses the compressed image data, a flicker detection unit 20, an external memory control unit 21 to which a detachable recording medium 22 is connected, and a display control unit 23 to which the display unit 24 mounted on, for example, the rear surface of the camera is connected.

The memory control unit 15, the digital signal processing unit 17, the compression and decompression processing unit 18, the flicker detection unit 20, the external memory control unit 21, and the display control unit 23 are connected to each other by a control bus 25 and a data bus 26 and are operated by commands from the system control unit 11.

In the digital camera having the above-mentioned structure, the flicker detection unit 20 detects a flicker caused by the flicker cycle (for example, $1/100$ seconds or $1/120$ seconds in the case of a commercial power supply with a frequency of 50 Hz or 60 Hz) of a light source such as a fluorescent lamp.

The flicker detection unit 20 compares a first captured image signal that is read from a plurality of pixels of the imaging element 5 for a first frame period based on the frame rate set by the system control unit 11 with a second captured image signal that is read from the plurality of pixels of the imaging element 5 for a second frame period based on the frame rate and determines whether there is a flicker. The frame period means a period from a falling edge to the next falling edge of the vertical synchronizing signal of the imaging element 5.

Figure 2:
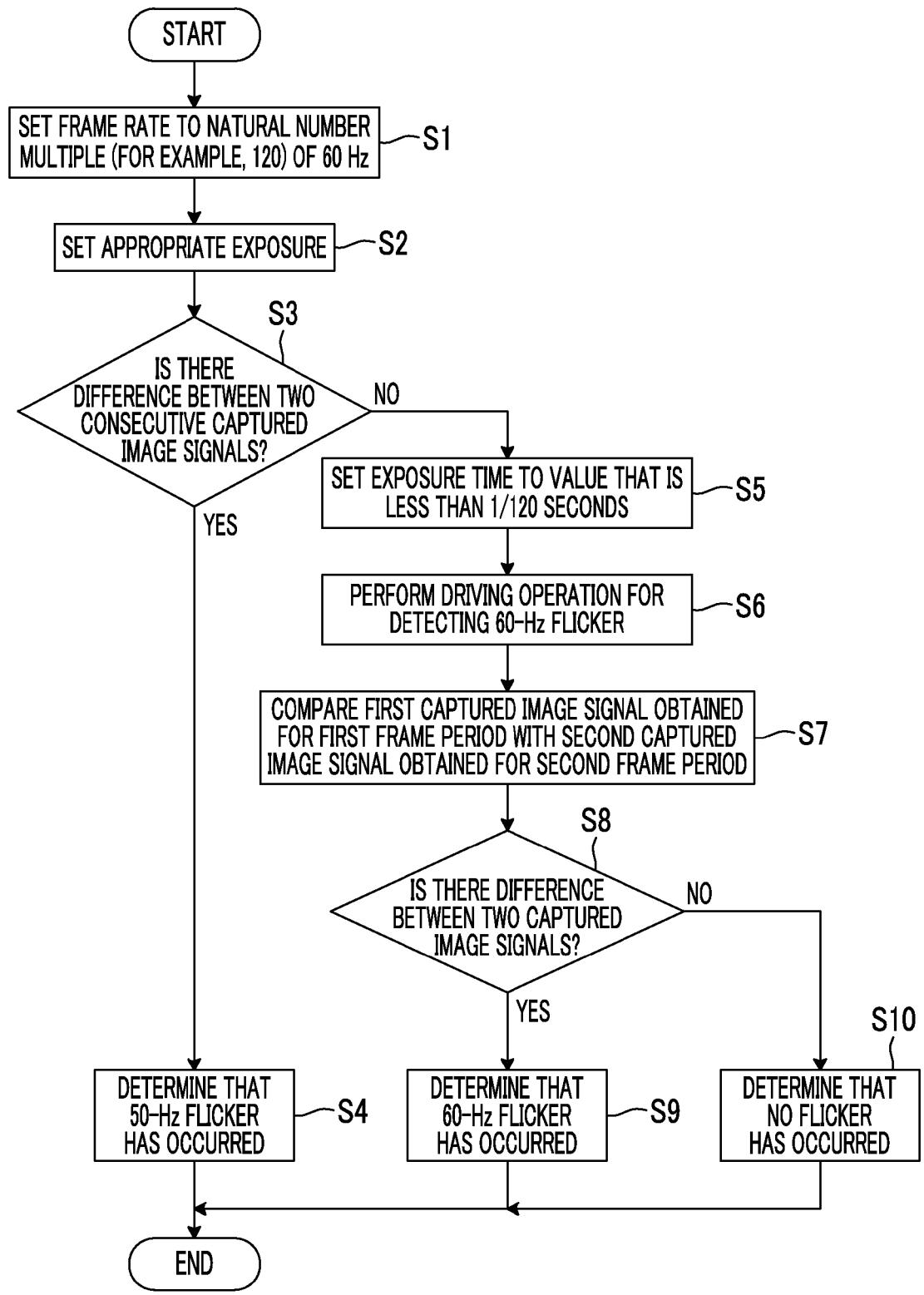
FIG. 2 is a flowchart illustrating a flicker detection operation.

FIG. 2 is a flowchart illustrating the flicker detection operation.

When the flicker detection operation starts, the system control unit 11 sets the frame rate to a value (here, 120 frames/second) that is a natural number multiple of 60 Hz which is one of the power frequencies of the commercial power supply (Step S1). Then, the system control unit 11 directs the imaging element driving unit 10 to drive the imaging element 5 on the basis of the set frame rate.

When the driving of the imaging element 5 starts on the basis of the frame rate set in Step S1, the system control unit 11 calculates appropriate exposure on the basis of the captured image signal output from the imaging element 5 and sets the calculated exposure value as an imaging condition (Step S2).

Specifically, the system control unit 11 controls the amount of opening of the stop 2 through the stop driving unit 9 on the basis of the calculated exposure value and notifies the imaging element driving unit 10 of the shutter speed (exposure time) of the imaging element 5 on the basis of the calculated exposure value. The imaging element driving unit 10 performs control such that each pixel of the imaging element 5 is exposed at the set exposure time, on the basis of the notification.

The exposure of an arbitrary pixel starts at the time when the pixel is reset and ends at the time when a signal corresponding to the charge accumulated in the pixel is read to the signal line.

That is, the imaging element driving unit 10 controls the reset time of each pixel and the time when a signal is read such that each pixel is exposed at the set exposure time.

Figure 3:
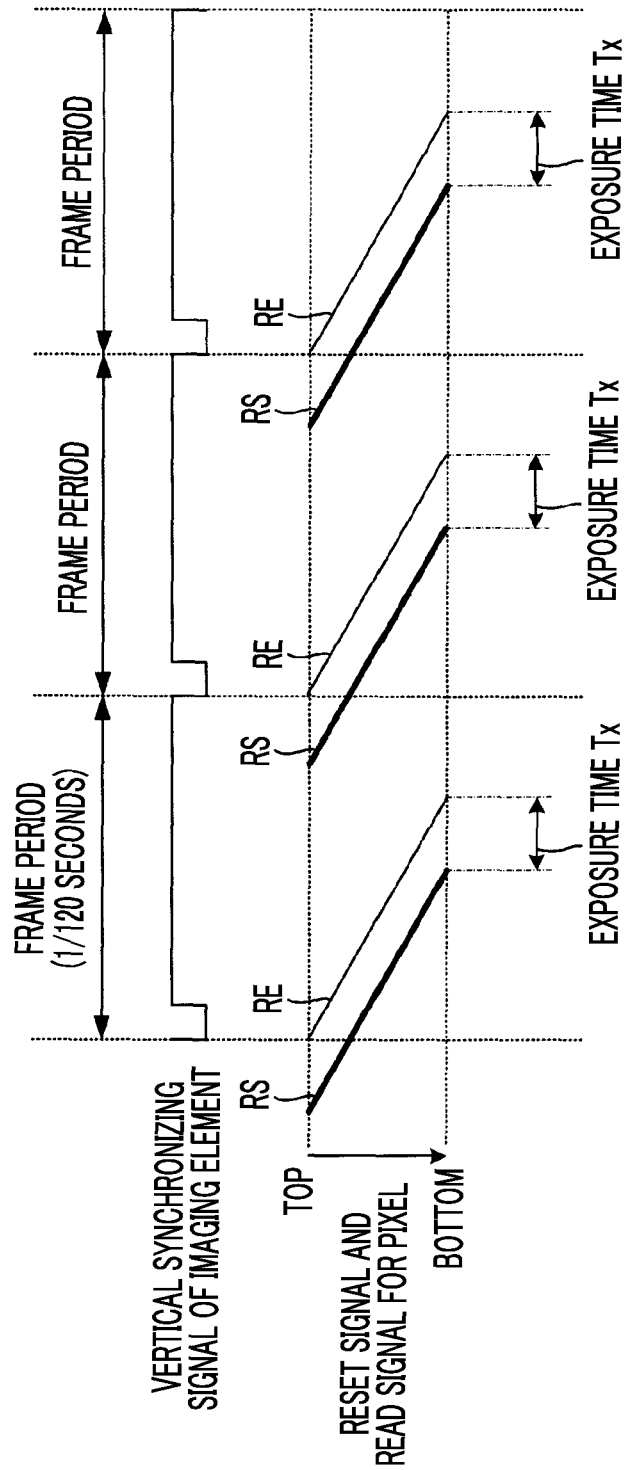
FIG. 3 is a timing chart illustrating the driving of an imaging element 5 after Step S2 in FIG. 2.

FIG. 3 is a timing chart illustrating the driving of the imaging element 5 after Step S2 in FIG. 2.

In FIG. 3, letters RS indicate a reset signal for resetting the pixels of the imaging element 5. In FIG. 3, letters RE indicate a read signal for reading a signal from the pixels of the imaging element 5.

In this embodiment, the reset signal and the read signal can be independently supplied to each scanning line including a plurality of pixels which are arranged in the horizontal direction of the imaging element 5.

In the example illustrated in FIG. 3, at the time that is an exposure time Tx before the falling time of the vertical synchronizing signal of the imaging element 5, the reset signal RS is sequentially supplied downward from the scanning lines in the area in which a plurality of pixels are arranged to the imaging element 5. The above-mentioned operation is repeated.

When the exposure time Tx elapses after the start of the supply of the reset signal RS and the vertical synchronizing signal of the imaging element 5 falls, the read signal RE is sequentially supplied downward from the scanning lines in the area in which a plurality of pixels are arranged to the imaging element 5.

The exposure time of each pixel is controlled to be the exposure time Tx by the above-mentioned driving operation. In addition, a captured image signal is output from the imaging element 5 at the set frame rate.

In the following description, the period from the start of the reading of a signal from the first scanning line of the imaging element 5 to the end of the reading of a signal from the last scanning line is referred to as a signal reading period for which signals are read from a plurality of pixels of the imaging element 5.

Returning to FIG. 2, after Step S2, the flicker detection unit 20 compares two captured image signals which are continuously output from the imaging element 5 (Step S3).

The flicker frequency of a fluorescent lamp that is operated by a commercial power supply with a frequency of 50 Hz is 50 Hz. The frame rate set in Step S1 is not a natural number multiple of 50 Hz.

Therefore, in a case in which a flicker (hereinafter, referred to as a 50-Hz flicker) caused by a commercial power frequency of 50 Hz occurs, a difference in brightness between the captured image signals obtained for two consecutive frame periods illustrated in FIG. 3 is caused by the flicker of the fluorescent lamp. In Step S3, the flicker detection unit 20 determines whether the difference in brightness between the captured image signals occurs.

When the determination result in Step S3 is "YES", the flicker detection unit 20 determines that the 50-Hz flicker has occurred and notifies the system control unit 11 of the determination result (Step S4).

When the determination result in Step S3 is "NO", the flicker detection unit 20 determines that a flicker (hereinafter, referred to as a 60-Hz flicker) caused by a commercial power frequency of 60 Hz has occurred or that no flicker has occurred and performs a process in Step S5 and the subsequent steps.

The flicker frequency of a fluorescent lamp that is operated by a commercial power supply with a frequency of 60 Hz is 60 Hz. The frame rate set in Step S1 is a natural number multiple of 60 Hz.

Therefore, in a case in which the 60-Hz flicker occurs, a difference in brightness between the captured image signals obtained for two consecutive frame periods illustrated in FIG. 3 is not caused by the flicker of the fluorescent lamp. Therefore, when the determination result in Step S3 is "NO", it is necessary to determine whether the 60-Hz flicker has occurred.

In Step S5, the system control unit 11 sets the exposure time of the imaging element 5 to a value (referred to as Txa) that is less than $1/120$ seconds which is the flicker cycle of the fluorescent lamp operated by a commercial power supply with a frequency of 60 Hz.

In addition, the system control unit 11 transmits an command to maintain the frame rate set in Step S1 and to change the driving method of the imaging element 5 to a driving method for detecting the 60-Hz flicker (referred to as a driving method for detecting a 60-Hz flicker) to the imaging element driving unit 10.

Figure 4:
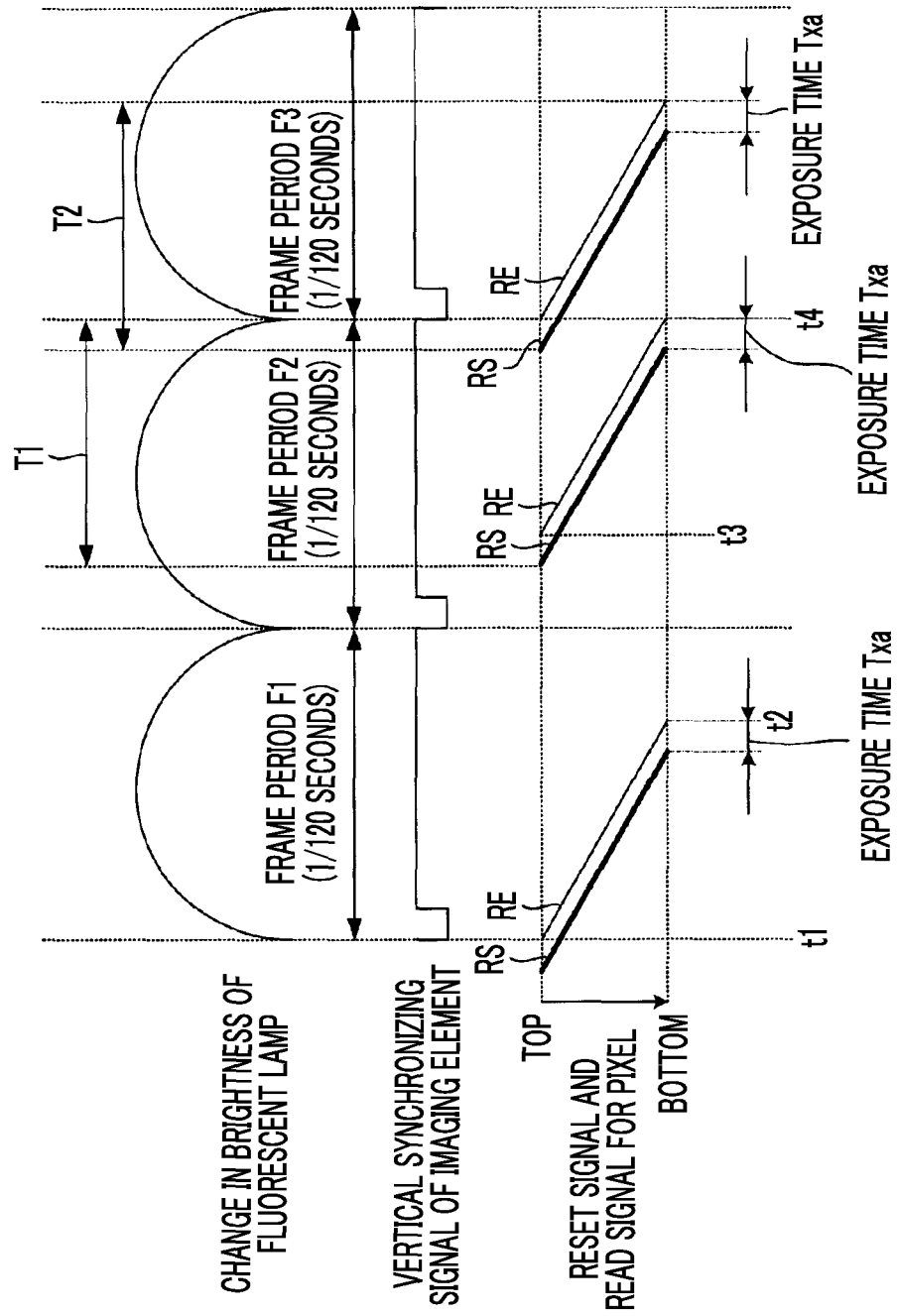
FIG. 4 is a timing chart illustrating an example of a driving operation for flicker detection of an imaging element driving unit 10 illustrated in FIG. 1.

The imaging element driving unit 10 drives the imaging element 5 using a driving method different from that illustrated in FIG. 3, in response to the command, as illustrated in FIG. 4 (Step S6).

For an arbitrary frame period F1, the imaging element driving unit 10 performs the same driving as that for each frame period illustrated in FIG. 3. That is, the imaging element driving unit 10 performs driving such that the start time (time t1) of the signal reading period coincides with the start time of the frame period F1.

For the frame period F1, the imaging element driving unit 10 performs driving such that the end time (a time t2 in FIG. 4) of the signal reading period is before the end time of the frame period F1. The frame period F1 forms a first frame period.

For a frame period F2 following the frame period F1, the imaging element driving unit 10 performs driving such that the start time (a time t3 in FIG. 4) of the signal reading period is after the start time of the frame period F2.

For the frame period F2, the imaging element driving unit 10 performs driving such that the end time (a time t4 in FIG. 4) of the signal reading period coincides with the end time of the frame period F2. The frame period F2 forms a second frame period.

For a frame period F3 following the frame period F2, the imaging element driving unit 10 performs the same driving as that for the frame period F1. The frame period F3 forms the first frame period.

As such, in Step S6, the imaging element driving unit 10 drives the imaging element 5 such that the first frame period and the second frame period are alternately arranged.

The imaging element driving unit 10 fixes the exposure time to Txa for each frame period. In addition, the imaging element driving unit 10 performs control such that the period from the time t1 to the time t2 is equal to the period from the time t3 to the time t4. That is, for each frame period, the signal reading periods have the same duration.

FIG. 4 illustrates a change in the brightness of a fluorescent lamp that is operated by a power supply frequency of 60 Hz, in addition to the timing chart illustrating the driving of the imaging element 5.

The first captured image signal read from the imaging element 5 for the frame period F3 illustrated in FIG. 4 is obtained by the sequential exposure of the scanning lines for a period T2 illustrated in FIG. 4.

Therefore, the first captured image signal includes a signal corresponding to a portion that overlaps the period T2 in the change in the brightness of the fluorescent lamp.

The second captured image signal read from the imaging element 5 for the frame period F2 illustrated in FIG. 4 is obtained by the sequential exposure of the scanning lines for a period T1 illustrated in FIG. 4.

Therefore, the second captured image signal includes a signal corresponding to a portion that overlaps the period T1 in the change in the brightness of the fluorescent lamp.

In the change in the brightness of the fluorescent lamp, the portion that overlaps the period T1 and the portion that overlaps the period T2 have different shapes. Therefore, when the 60-Hz flicker occurs, a difference in brightness between the first captured image signal and the second captured image signal occurs in the plane.

In contrast, when no flicker occurs, the difference in brightness between the first captured image signal and the second captured image signal does not occur in the plane.

That is, the first captured image signal and the second captured image signal are compared to determine whether the 60-Hz flicker occurs.

Returning to FIG. 2, when the driving illustrated in FIG. 4 is performed in Step S6, the flicker detection unit 20 compares the first captured image signal output from the imaging element 5 for the first frame period (for example, the frame period F1) in FIG. 4 with the second captured image signal output from the imaging element 5 for the second frame period (for example, the frame period F2) in FIG. 4 (Step S7).

For example, the flicker detection unit 20 divides each of the first captured image signal and the second captured image signal into a plurality of blocks in the direction in which the scanning lines are arranged and calculates the average brightness of the pixel signals in each block.

Then, the flicker detection unit 20 calculates the difference between the average brightness values of the corresponding blocks in the first captured image signal and the second captured image signal. When the average of the differences is equal to or greater than a threshold value TH, the flicker detection unit 20 determines that there is a difference therebetween (Step S8: YES) and determines that the 60-Hz flicker has occurred (Step S9).

On the other hand, when the average of the differences is less than the threshold value TH, the flicker detection unit 20 determines that there is no difference therebetween (Step S8: NO) and determines that no flicker has occurred (Step S10).

A method for comparing two captured image signals is not limited to the above-mentioned method. For example, in a case in which the difference between the average brightness values of all of the corresponding pixel signals in two captured image signals is equal to or greater than a threshold value, it may be determined that there is a difference between the two captured image signals.

As described above, according to the digital camera illustrated in FIG. 1, the imaging element driving unit 10 performs a driving operation that includes the first frame period and the second frame period having the signal reading periods at different positions. Therefore, it is possible to determine whether the 60-Hz flicker occurs, without providing the frame period in which the exposure time Txa is a natural number multiple of the flicker cycle of the fluorescent lamp operated by a commercial power frequency of 60 Hz, unlike the related art.

As such, since it is not necessary to provide the frame period in which the exposure time Txa is a natural number multiple of the flicker cycle of the fluorescent lamp operated by a commercial power frequency of 60 Hz, it is possible to reduce the exposure time even in a state in which the object is very bright and to prevent the halation of the captured image signal. As a result, it is possible to detect a flicker with high accuracy.

It is possible to display an appropriate live view image on the display unit 24 while a flicker is being detected. Therefore, it is possible to prevent the user from feeling discomfort.

According to the digital camera illustrated in FIG. 1, it is possible to set the frame rate to a constant value and to detect a flicker. Therefore, display blurring does not occur while a flicker is being detected and it is possible to prevent the user from feeling discomfort.

Since the frame rate is constant, the process of the entire system is simplified and it is possible to reduce a system load and the design costs of the system.

Since the exposure time Txa does not change, a process for removing the difference in brightness caused by a difference in exposure time between the first captured image signal and the second captured image signal is not required when the first captured image signal and the second captured image signal are compared. Therefore, it is possible to reduce the amount of processing required to detect a flicker.

In Step S5 of FIG. 2, the exposure time is set to a value that is less than 1/120 seconds. However, in a case in which the exposure time based on the appropriate exposure set in Step S2 is less than 1/120 seconds, it is not necessary change the setting of the exposure time in Step S5.

When the determination result in Step S3 is "NO", the system control unit 11 may change the frame rate to a value that is less than the value set in Step S1.

For example, in Step S5, the system control unit 11 changes the frame rate from 120 frames/second to 60 frames/second.

As such, the frame rate is lowered to reduce the proportion of the signal reading period to each frame period. The reduction in the proportion can make a significant difference in shape between a portion that overlaps the period T1 and a portion that overlaps the period T2 in FIG. 4 in a waveform indicating a change in the brightness of the fluorescent lamp. Therefore, it is possible to detect whether the 60-Hz flicker occurs with high accuracy.

In the example of the operation illustrated in FIG. 2, when the determination result in Step S3 is "NO", the frame rate is maintained at 120 frames/second. Therefore, in Step S5, the exposure time is set to a value that is less than $\frac{1}{120}$ seconds.

However, when the determination result in Step S3 is "NO", the frame rate may be less than 120 frames/second. In this case, in Step S5, the exposure time is not limited to the value that is less than $\frac{1}{120}$ seconds and can be set to a value other than a natural number multiple of $\frac{1}{120}$ seconds. In this case, similarly, the driving illustrated in FIG. 4 is performed to determine whether the 60-Hz flicker occurs.

As such, the frame rate is reduced to increase the exposure time Txa. Therefore, it is possible to accurately detect a flicker even when the object is dark.

In the operation illustrated in FIG. 2, the frame rate is changed only when the 60-Hz flicker is likely to occur and the duration of a neighboring frame period is not frequently changed. Therefore, it is possible to minimize the user's discomfort. In addition, it is possible to minimize the design costs of the system.

In the example of the operation illustrated in FIG. 2, it is determined whether the 50-Hz flicker has occurred first. However, it may be determined whether the 60-Hz flicker has occurred first. When it is determined that the 60-Hz flicker has not occurred, it may be determined whether the 50-Hz flicker has occurred.

Figure 5:
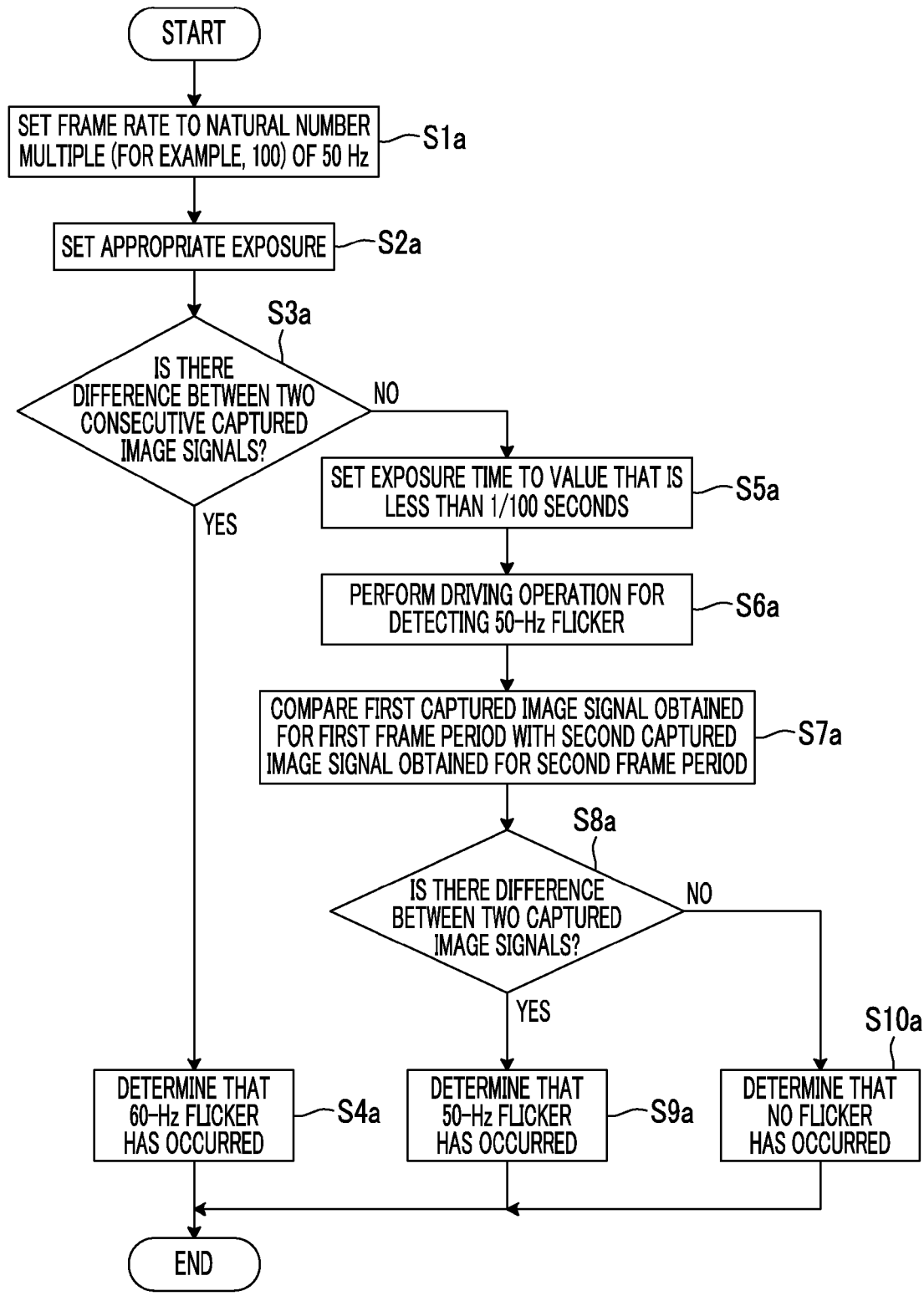
FIG. 5 is a flowchart illustrating a modification example of a flicker detection operation of the digital camera illustrated in FIG. 1.

FIG. 5 is a flowchart illustrating a modification example of the flicker detection operation of the digital camera illustrated in FIG. 1.

First, the system control unit 11 sets the frame rate to a value (here, 100 frames/second) that is a natural number multiple of 50 Hz which is one of the power frequencies of the commercial power supply (Step S1a).

Then, the system control unit 11 directs the imaging element driving unit 10 to drive the imaging element 5 on the set frame rate.

In Step S2a, the system control unit 11 calculates appropriate exposure on the basis of the captured image signal output from the imaging element 5 and sets the calculated exposure value as an imaging condition.

After Step S2a, the flicker detection unit 20 compares two captured image signals which are continuously output from the imaging element 5 (Step S3a).

The flicker frequency of a fluorescent lamp that is operated by a commercial power supply with a frequency of 60 Hz is 60 Hz. The frame rate set in Step S1a is not a natural number multiple of 60 Hz.

Therefore, in a case in which the 60-Hz flicker has occurred, a difference in brightness between the captured image signals obtained for two consecutive frame periods illustrated in FIG. 3 is caused by the flicker of the fluorescent lamp. In Step S3a, the flicker detection unit 20 determines whether the difference in brightness between the captured image signals occurs.

When the determination result in Step S3a is "YES", the flicker detection unit 20 determines that the 60-Hz flicker has occurred and notifies the system control unit 11 of the determination result (Step S4a).

When the determination result in Step S3a is "NO", the flicker detection unit 20 determines that the 50-Hz flicker has occurred or that no flicker has occurred and performs a process in Step S5a and the subsequent steps.

In Step S5a, the system control unit 11 sets the exposure time of the imaging element 5 to a value (referred to as Txa) that is less than $\frac{1}{100}$ seconds which is the flicker cycle of the fluorescent lamp operated by a commercial power supply with a frequency of 50 Hz.

In addition, the system control unit 11 transmits an command to change the driving method of the imaging element 5 to a driving method for detecting the 50-Hz flicker (referred to as a driving method for detecting a 50-Hz flicker) while maintaining the frame rate set in Step S1a to the imaging element driving unit 10. The driving method for detecting a 50-Hz flicker is the same as the driving method for detecting a 60-Hz flicker.

The imaging element driving unit 10 drives the imaging element 5 using a driving method different from that illustrated in FIG. 3, in response to the command, as illustrated in FIG. 4 (Step S6a).

When the driving illustrated in FIG. 4 is performed in Step S6a, the flicker detection unit 20 compares the first captured image signal output from the imaging element 5 for the first frame period (for example, the frame period F1) in FIG. 4 with the second captured image signal output from the imaging element 5 for the second frame period (for example, the frame period F2) in FIG. 4 (Step S7a).

When it is determined that there is a difference between the first and second captured image signals (Step S8a: YES), the flicker detection unit 20 determines that the 50-Hz flicker has occurred (Step S9a).

On the other hand, when it is determined that there is no difference between the first and second captured image signals (Step S8a: No), the flicker detection unit 20 determines that the 50-Hz flicker has not occurred (Step S10a).

It is preferable that a large difference in brightness between the two captured image signals compared in Step S7 of FIG. 2 and Step S7a of FIG. 5 does not occur due to factors other than a flicker.

Therefore, preferably, the imaging element driving unit 10 performs driving such that the first frame period and the second frame period are alternately arranged and the flicker detection unit 20 compares the captured image signals obtained from the first frame period and the second frame period which are temporally adjacent to each other.

It is preferable that the captured image signal obtained for the second frame period and the captured image signal obtained for the first frame period following the second frame period are used as the two captured image signals to be compared. For example, in the example illustrated in FIG. 4, it is preferable to compare the captured image signals obtained for the frame period F2 and the frame period F3.

The captured image signals obtained for the frame period F2 and the frame period F3 are captured and obtained at a shorter interval than the captured image signals obtained for the frame period F1 and the frame period F2.

Therefore, even in a case in which the object is moving, it is possible to prevent a change in the brightness of two captured image signals due to the movement and to improve the accuracy of detecting a flicker.

Figure 6:
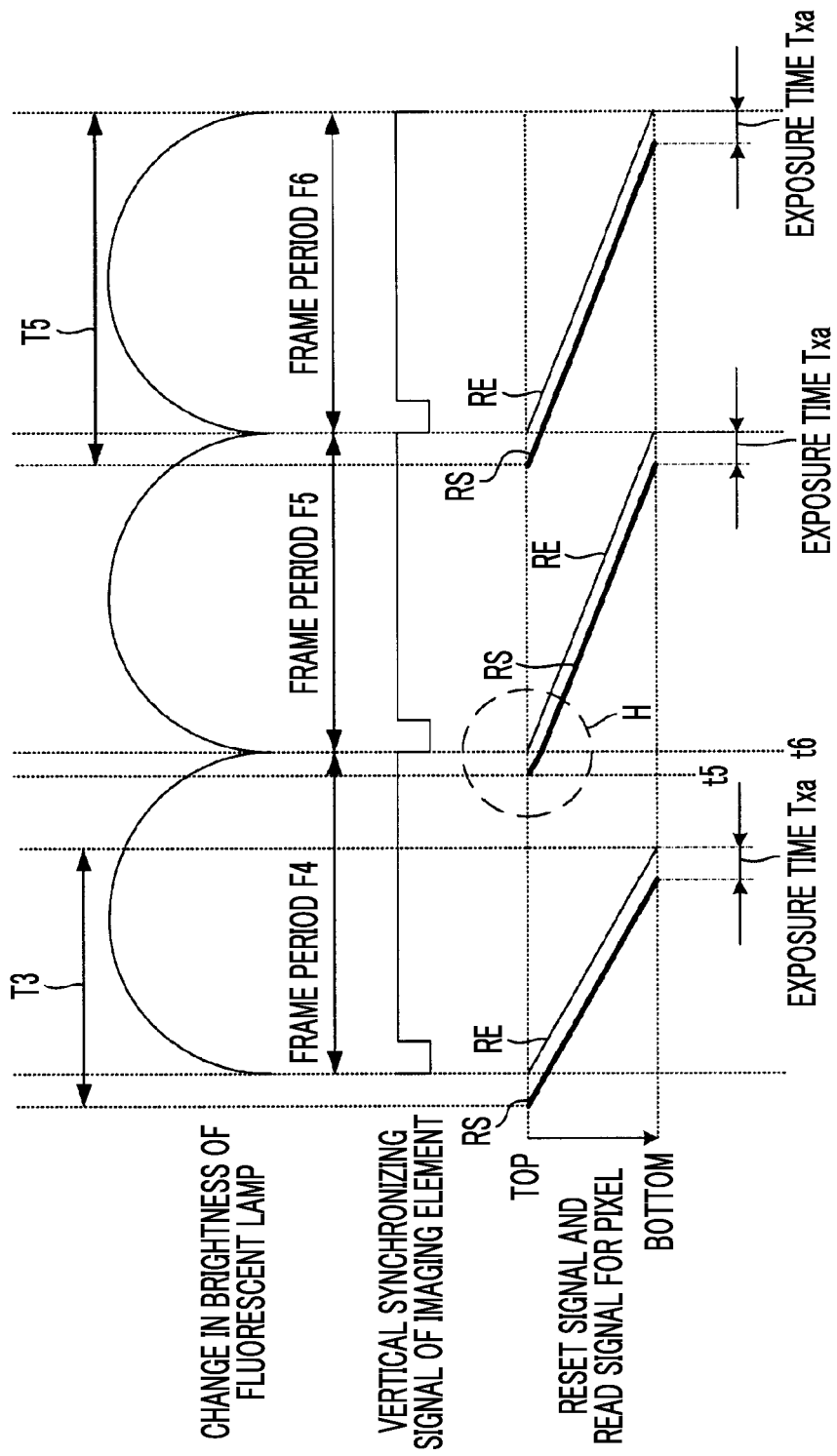
FIG. 6 is a timing chart illustrating a modification example of the driving operation for flicker detection of the imaging element driving unit 10 illustrated in FIG. 1.

FIG. 6 is a timing chart illustrating a modification example of the driving operation for detecting a 50-Hz flicker and the driving operation for detecting a 60-Hz flicker.

For a frame period F4 illustrated in FIG. 6, the same driving as that for the frame period F1 and the frame period F3 illustrated in FIG. 4 is performed. The frame period F4 forms the first frame period.

In a frame period F5 and a frame period F6 illustrated in FIG. 6, a signal reading period is longer than that in the frame period F4.

The frame period F5 and the frame period F6 form the second frame period. The frame period F5 forms another frame period.

Specifically, the start time of the signal reading period in the frame period F5 coincides with the start time of the frame period F5 and the end time of the signal reading period coincides with the end time of the frame period F5.

Similarly, the start time of the signal reading period in the frame period F6 coincides with the start time of the frame period F6 and the end time of the signal reading period is coincides with the end time of the frame period F6.

The second captured image signal which is read from the imaging element 5 for the frame period F6 in FIG. 6 by the above-mentioned driving is obtained by the sequential exposure of the scanning lines for the period T5 in FIG. 6.

Therefore, the second captured image signal includes a signal corresponding to a portion that overlaps the period T5 in a change in the brightness of the fluorescent lamp.

The scanning lines are sequentially exposed for the period T3 in FIG. 6 to obtain the first captured image signal which is read from the imaging element 5 for the frame period F4 in FIG. 6.

Therefore, the first captured image signal includes a signal corresponding to a portion that overlaps the period T3 in the change in the brightness of the fluorescent lamp.

In the change in the brightness of the fluorescent lamp, the portion that overlaps the period T3 and the portion that overlaps the period T5 have different shapes. Therefore, when the 60-Hz flicker occurs, a difference in brightness between the first captured image signal and the second captured image signal occurs in the plane.

In contrast, when no flicker occurs, the difference in brightness between the first captured image signal and the second captured image signal does not occur in the plane.

That is, the first captured image signal and the second captured image signal are compared to determine whether the 60-Hz flicker occurs.

The exposure time Txa of the imaging element 5 is controlled such that it is the same for the frame period F4, the frame period F5, and the frame period F6. However, the exposure time of some of the scanning lines from which signals are read for the frame period F5 is not Txa.

Figure 7:
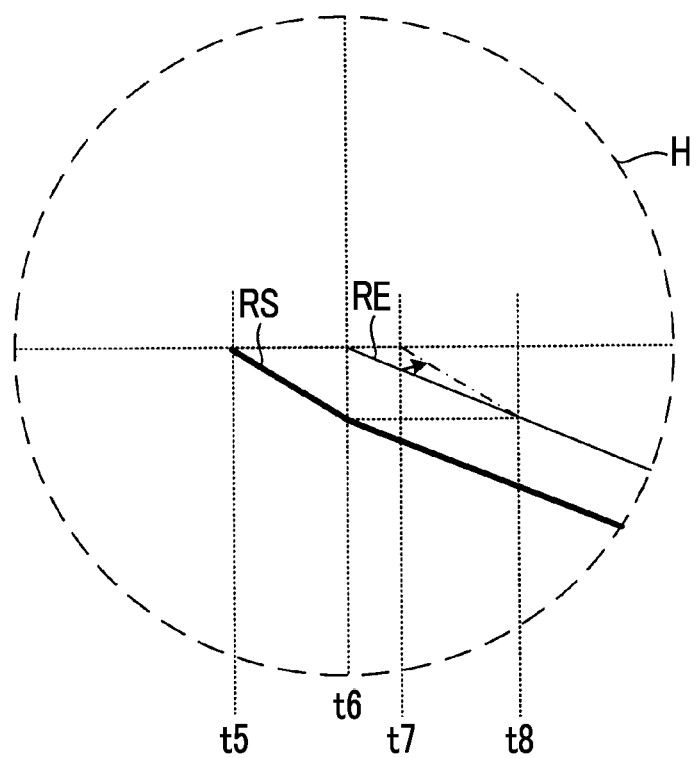
FIG. 7 is an enlarged view illustrating a range H in FIG. 6.

FIG. 7 is an enlarged view illustrating a range H illustrated in FIG. 6.

As illustrated in FIG. 7, at a time t5 immediately before the frame period changes from the frame period F4 to the frame period F5, the reset signal is supplied to the imaging element 5 on the basis of a timing signal that is set for the frame period F4.

At a start time t6 of the frame period F5 that is some time after the time t5, the timing signal for determining the time when the reset signal is supplied is updated with a timing signal for the frame period F5 and the reset signal is supplied to the imaging element 5. Therefore, there is a difference between the gradient of the reset signal RS between the time t5 and the time t6 and the gradient of the reset signal RS after the time t6.

As a result, the exposure time of the scanning line to which the reset signal is supplied for the period from the time t5 to the time t6 is shorter than the exposure time of the scanning line to which the reset signal is supplied after the time t6.

The gradient of the reset signal for the frame period F5 is applied to each pixel from which a signal is read from the frame period F6 following the frame period F5, without any change. Therefore, the exposure times of each pixel can coincide with each other.

In a case in which the driving illustrated in FIG. 6 is performed in Step S6 of FIG. 2 or Step S6a of FIG. 5, the flicker detection unit 20 compares the first captured image signal read for the frame period F4 which is the first frame period with the second captured image signal read for the frame period F6 which is the second frame period following the frame period F5 that follows the frame period F4 to determine whether the 50-Hz flicker or the 60-Hz flicker has occurred, considering the above-mentioned phenomenon.

According to this structure, it is possible to compare two captured image signals having the exposure times that coincide with each other and to simplify the process for determining whether a flicker occurs.

In a case in which the driving illustrated in FIG. 6 is performed in Step S6 of FIG. 2 or Step S6a of FIG. 5, the flicker detection unit 20 may compare the first captured image signal read for the frame period F4 which is the first frame period with the second captured image signal read for the frame period F5 which is the second frame period following the frame period F4 to determine whether a flicker has occurred.

In this case, in the second captured image signal read for the frame period F5, the brightness of a signal read from the pixel that is reset for the period from the time t5 to the time t6 may be corrected on the basis of the ratio of the gradient of the reset signal between the time t5 and the time t6 to the gradient of the reset signal after the time t6 so as to be the same level as the brightness of the signal read after the time t6 and the first captured image signal and the second captured image signal may be compared with each other.

Alternatively, for the frame period F5, the imaging element driving unit 10 may control the time when a signal is read from the pixel (the pixel reset between the time t5 and the time t6) reset for the frame period F4 such that the exposure time of the pixel coincides with the exposure time of the pixel reset for the frame period F5.

Specifically, as illustrated in FIG. 7, the imaging element driving unit 10 does not supply the read signal RE for the period from the time t6 to a time t7. Then, at the time t7, the imaging element driving unit 10 supplies the read signal RE with the same gradient (a one-dot chain line in FIG. 7) as that of the reset signal RS between the time t5 and the time t6.

After a time t8, the imaging element driving unit 10 supplies the read signal RE with the same gradient as that of the reset signal RS after the time t6.

According to this structure, the exposure times of each pixel from which a signal is read for the frame period F5 can coincide with each other.

Therefore, the flicker detection unit 20 compares the first captured image signal read for the frame period F4 with the second captured image signal read for the frame period F5 which is the second frame period following the frame period F4 to determine whether a flicker has occurred.

Next, the structure of a smart phone as an imaging apparatus will be described.

Figure 8:
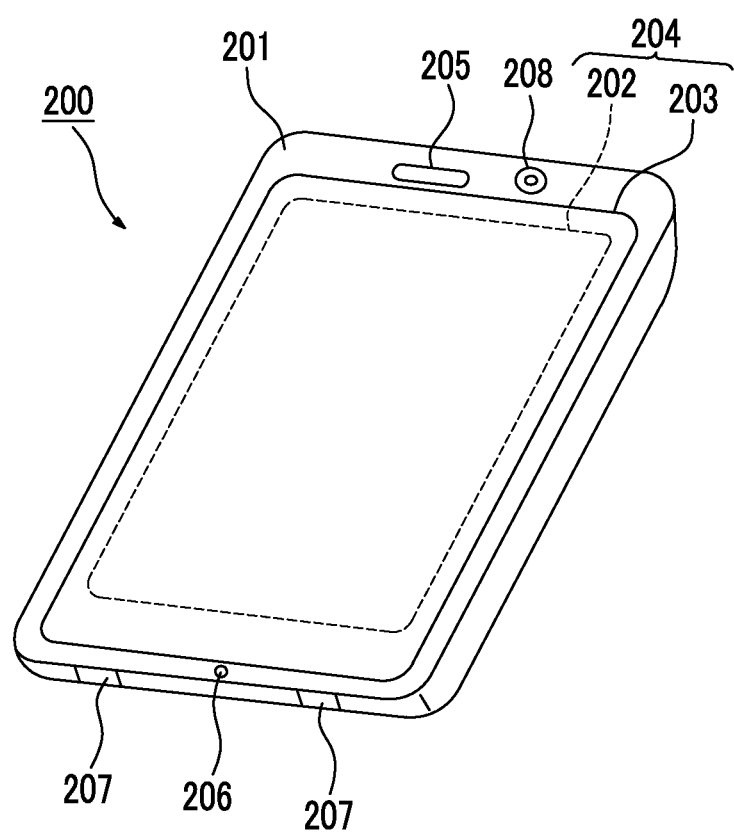
FIG. 8 is a diagram illustrating the outward appearance of a smart phone as the imaging apparatus.

FIG. 8 illustrates the outward appearance of a smart phone 200 which is an embodiment of the imaging apparatus according to the invention. The smart phone 200 illustrated in FIG. 8 includes a housing 201 with a flat panel shape. The smart phone 200 comprises a display input unit 204 having a display panel 202 as a display unit and an operation panel 203 as an input unit which are integrally formed on one surface of the housing 201.

The housing 201 comprises a speaker 205, a microphone 206, an operation unit 207, and a camera unit 208. However, the configuration of the housing 201 is not limited thereto. For example, the display unit and the input unit may be independently provided or the housing 201 may have a folding structure or a sliding structure.

Figure 9:
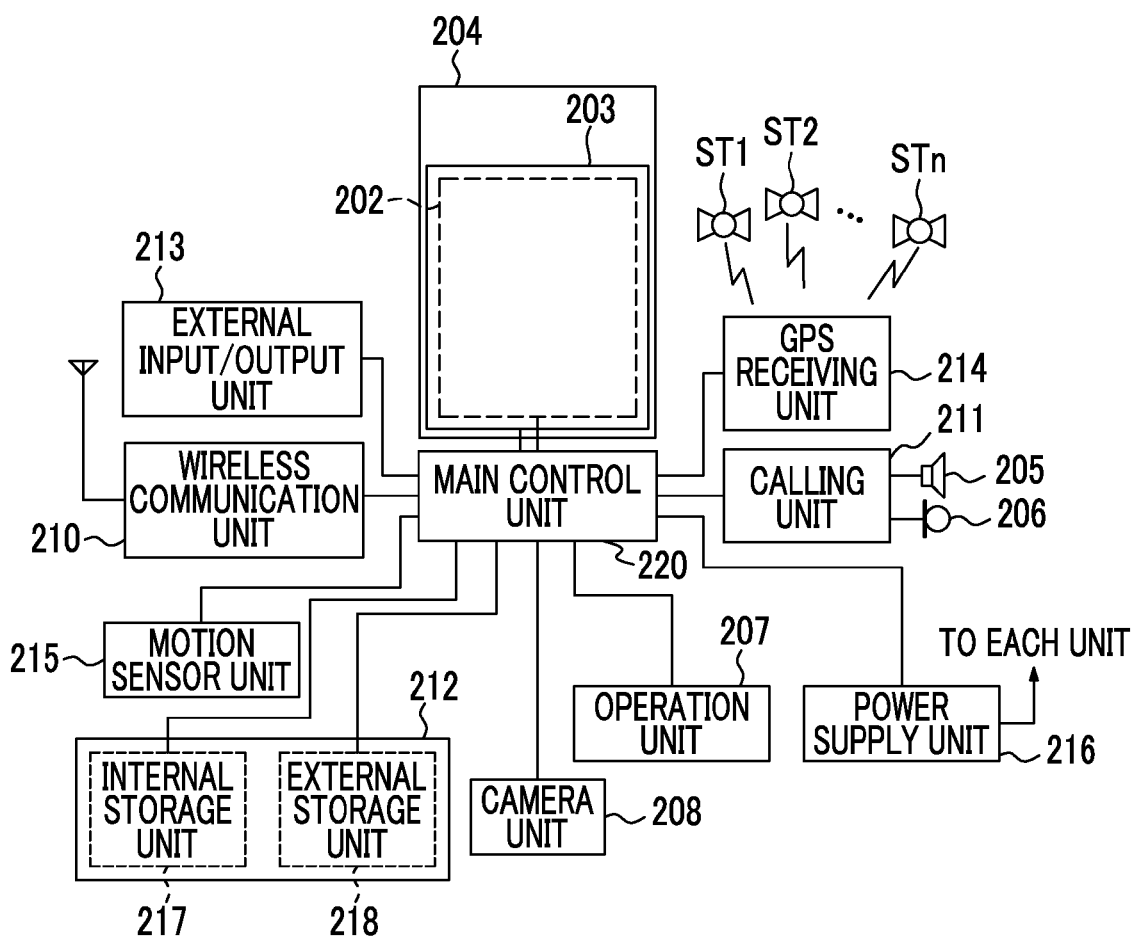
FIG. 9 is a diagram illustrating the internal structure of the smart phone illustrated in FIG. 8.

FIG. 9 is a block diagram illustrating the structure of the smart phone 200 illustrated in FIG. 8.

As illustrated in FIG. 9, the smart phone 200 comprises, as main components, a wireless communication unit 210, the display input unit 204, a calling unit 211, the operation unit 207, the camera unit 208, a storage unit 212, an external input/output unit 213, a global positioning system (GPS) receiving unit 214, a motion sensor unit 215, a power supply unit 216, and a main control unit 220. In addition, the smart phone 200 has, as a main function, a wireless communication function which performs mobile wireless communication through a base station apparatus (not illustrated) and a mobile communication network (not illustrated).

The wireless communication unit 210 performs wireless communication with the base station apparatus which is accommodated in the mobile communication network in response to an command from the main control unit 220. The wireless communication is used to transmit and receive various types of file data, such as voice data and image data, and electronic mail data or to receive, for example, web data or streaming data.

The display input unit 204 is a so-called touch panel that displays, for example, images (still images and motion pictures) or text information to visually transmit information to the user and detects the user's operation for the displayed information under the control of the main control unit 220 and comprises the display panel 202 and the operation panel 203.

The display panel 202 uses, for example, a liquid crystal display (LCD) or an organic electro-luminescence display (OELD) as a display device.

The operation panel 203 is a device that is provided such that an image displayed on a display surface of the display panel 202 can be visually recognized and detects one or a plurality of coordinate points operated by a finger of the user or a stylus. When the device is operated by a finger of the user or a stylus, a detection signal which is generated by the operation is output to the main control unit 220. Then, the main control unit 220 detects an operation position (coordinates) on the display panel 202 on the basis of the received detection signal.

As illustrated in FIG. 8, the display panel 202 and the operation panel 203 of the smart phone 200 that is exemplified as an embodiment of the imaging apparatus according to the invention are integrated to form the display input unit 204 and the operation panel 203 is provided so as to completely cover the display panel 202.

In a case in which this structure is used, the operation panel 203 may have a function of detecting the user's operation even in a region other than the display panel 202. In other words, the operation panel 203 may comprise a detection region (hereinafter, referred to as a display region) for an overlap portion which overlaps the display panel 202 and a detection region (hereinafter, referred to as a non-display region) for an outer edge portion which does not overlap the display panel 202.

The size of the display region may be exactly equal to the size of the display panel 202. However, the sizes are not necessarily equal to each other. The operation panel 203 may comprise two sensitive regions, that is, an outer edge portion and an inner portion other than the outer edge portion.

The width of the outer edge portion is appropriately designed according to, for example, the size of the housing 201. Examples of a position detection method which is used in the operation panel 203 include a matrix switching method, a resistive film method, a surface elastic wave method, an infrared method, an electromagnetic induction method, and a capacitive sensing method. Any of the methods may be used.

The calling unit 211 comprises the speaker 205 and the microphone 206. The calling unit 211 converts the voice of the user which is input through the microphone 206 into voice data which can be processed by the main control unit 220 and outputs the converted voice data to the main control unit 220. In addition, the calling unit 211 decodes voice data received by the wireless communication unit 210 or the external input/output unit 213 and outputs the decoded voice data from the speaker 205.

As illustrated in FIG. 8, for example, the speaker 205 can be mounted on the same surface as the display input unit 204 and the microphone 206 can be mounted on the side surface of the housing 201.

The operation unit 207 is a hardware key which uses, for example, a key switch and receives commands from the user. For example, as illustrated in FIG. 8, the operation unit 207 is a push button switch which is mounted on the side surface of the housing 201 of the smart phone 200, is turned on when it is pressed by, for example, a finger, and is turned off by the restoring force of a spring when the finger is taken off.

The storage unit 212 stores a control program or control data of the main control unit 220, application software, address data which is associated with, for example, the names or phone numbers of communication partners, transmitted and received electronic mail data, web data which is downloaded by web browsing, or downloaded content data. In addition, the storage unit 212 temporarily stores, for example, streaming data. The storage unit 212 includes an internal storage unit 217 which is provided in the smart phone and an external storage unit 218 which has a slot for a detachable external memory. The internal storage unit 217 and the external storage unit 218 forming the storage unit 212 may be implemented by a storage medium, such as a flash memory, a hard disk, a multimedia-card-micro-type memory, a card-type memory, a random access memory (RAM), or a read only memory (ROM).

The external input/output unit 213 functions as an interface with all of the external apparatuses connected to the smart phone 200 and is directly or indirectly connected to other external apparatuses by communication (for example, universal serial bus (USB) or IEEE1394) or a network (for example, the Internet, a wireless local area network (LAN), a Bluetooth (registered trademark) network, a radio frequency identification (RFID) network, an infrared communication network, an ultra wideband (UWB) (registered trademark) network, or a ZigBee (registered trademark) network).

Examples of the external apparatus connected to the smart phone 200 include a wired/wireless headset, a wired/wireless external charger, a wired/wireless data port, a memory card which is connected through a card socket, a subscriber identity module (SIM) card, a user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, an earphone which is connected wirelessly or in a wired manner. The external input/output unit 213 can transmit data which is received from the external apparatus to each component of the smart phone 200 or can transmit data in the smart phone 200 to the external apparatus.

The GPS receiving unit 214 receives GPS signals transmitted from GPS satellites ST1 to STn and performs a position measurement process on the basis of a plurality of received GPS signals to detect a position including the latitude, longitude, and height of the smart phone 200, in response to an command from the main control unit 220. When the GPS receiving unit 214 can acquire positional information from the wireless communication unit 210 or the external input/output unit 213 (for example, a wireless LAN), it can detect the position using the positional information.

The motion sensor unit 215 comprises, for example, a triaxial acceleration sensor and detects the physical movement of the smart phone 200 in response to an command from the main control unit 220. When the physical movement of the smart phone 200 is detected, the moving direction or acceleration of the smart phone 200 is detected. The detection result is output to the main control unit 220.

The power supply unit 216 supplies power which is stored in a battery (not illustrated) to each unit of the smart phone 200 in response to an command from the main control unit 220.

The main control unit 220 comprises a microprocessor, operates on the basis of the control program or control data stored in the storage unit 212, and controls the overall operation of each unit of the smart phone 200. The main control unit 220 has an application processing function and a mobile communication control function of controlling each unit of a communication system in order to perform voice communication or data communication through the wireless communication unit 210.

The application processing function is implemented by the operation of the main control unit 220 based on the application software which is stored in the storage unit 212. Examples of the application processing function include an infrared communication function which controls the external input/output unit 213 such that data communication with an opposing apparatus is performed, an electronic mail function which transmits and receives electronic mail, and a web browsing function which browses web pages.

The main control unit 220 has, for example, an image processing function which displays a video on the display input unit 204 on the basis of image data (still image data or motion picture data) such as received data or downloaded streaming data. The image processing function means the function of the main control unit 220 decoding the image data, performing image processing on the decoding result, and displaying the image on the display input unit 204.

The main control unit 220 performs display control for the display panel 202 and operation detection control for detecting the operation of the user through the operation unit 207 and the operation panel 203. The main control unit 220 performs the display control to display a software key, such as an icon for starting application software or a scroll bar, or to display a window for creating electronic mail.

The scroll bar means a software key for receiving an command to move a displayed portion of an image that is too large to fit into the display region of the display panel 202.

The main control unit 220 performs the operation detection control to detect the operation of the user input through the operation unit 207, to receive an operation for the icon or the input of a character string to an input field of the window through the operation panel 203, or to receive a request to scroll the displayed image through the scroll bar.

In addition, the main control unit 220 has a touch panel control function that performs the operation detection control to determine whether the position of an operation for the operation panel 203 is an overlap portion (display region) which overlaps the display panel 202 or an outer edge portion (non-display region) which does not overlap the display panel 202 other than the overlap portion and controls a sensitive region of the operation panel 203 or the display position of the software key.

The main control unit 220 can detect a gesture operation for the operation panel 203 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 208 includes the structures other than the external memory control unit 21, the recording medium 22, the display control unit 23, the display unit 24, and the operation unit 14 in the digital camera illustrated in FIG. 1.

The captured image data generated by the camera unit 208 can be recorded in the storage unit 212 or can be output through the external input/output unit 213 or the wireless communication unit 210.

In the smart phone 200 illustrated in FIG. 8, the camera unit 208 is mounted on the same surface as the display input unit 204. However, the mounting position of the camera unit 208 is not limited thereto. For example, the camera unit 208 may be mounted on the rear surface of the display input unit 204.

The camera unit 208 can be used for various functions of the smart phone 200. For example, the image acquired by the camera unit 208 can be displayed on the display panel 202 or the image acquired by the camera unit 208 can be used as one of the operation inputs of the operation panel 203.

When the GPS receiving unit 214 detects the position, the position may be detected with reference to the image from the camera unit 208. In addition, the optical axis direction of the camera unit 208 in the smart phone 200 may be determined or the current usage environment may be determined, with reference to the image from the camera unit 208, using the triaxial acceleration sensor or without using the triaxial acceleration sensor. Of course, the image from the camera unit 208 may be used in the application software.

In addition, for example, the positional information acquired by the GPS receiving unit 214, the voice information acquired by the microphone 206 (for example, the voice information may be converted into text information by the main control unit), and the posture information acquired by the motion sensor unit 215 may be added to still image data or motion picture data and the image data may be recorded in the storage unit 212 or may be output through the external input/output unit 213 or the wireless communication unit 210.

In the smart phone 200 having the above-mentioned structure, a flicker can be accurately detected by the operations illustrated in FIGS. 2 and 5.

As described above, the following matters are disclosed in the specification.

A disclosed imaging apparatus comprises: a MOS imaging element that includes a plurality of pixels which are two-dimensionally arranged; an imaging element driving unit that drives the imaging element using a rolling shutter method such that the imaging element performs a plurality of imaging operations at an arbitrary frame rate; and a flicker detection unit that compares a first captured image signal which is read from the plurality of pixels for a first frame period based on the frame rate with a second captured image signal which is read from the plurality of pixels for a second frame period based on the frame rate to detect whether a flicker has occurred. The imaging element driving unit performs the driving such that an end time of a signal reading period for which a signal is read from the plurality of pixels in the first frame period is before an end time of the first frame period and an end time of the signal reading period in the second frame period coincides with an end time of the second frame period.

In the disclosed imaging apparatus, the imaging element driving unit performs the driving such that a start time of the signal reading period in the second frame period is after a start time of the second frame period.

In the disclosed imaging apparatus, the imaging element driving unit performs the driving such that the signal reading period in the second frame period is longer than the signal reading period in the first frame period.

In the disclosed imaging apparatus, the imaging element driving unit performs the driving such that a start time of the signal reading period in the second frame period coincides with a start time of the second frame period.

In the disclosed imaging apparatus, another frame period is present between the first frame period and the second frame period and the imaging element driving unit drives the imaging element for another frame period, using the same method as that for the second frame period.

In the disclosed imaging apparatus, the second frame period follows the first frame period and the flicker detection unit corrects the brightness of a signal which has been read from the pixel reset for the first frame period in the second captured image signal and compares the corrected second captured image signal with the first captured image signal to determine whether a flicker has occurred.

In the disclosed imaging apparatus, the second frame period follows the first frame period and the imaging element driving unit controls the time when a signal is read from a pixel, which has been reset for the first frame period, in the second frame period such that an exposure time of the pixel coincides with an exposure time of a pixel reset for the second frame period.

In the disclosed imaging apparatus, the imaging element driving unit directs the imaging element to perform a plurality of imaging operations while alternately repeating the first frame period and the second frame period.

In the disclosed imaging apparatus, the flicker detection unit compares the second captured image signal read for the second frame period with the first captured image signal read for the first frame period following the second frame period to determine whether a flicker has occurred.

In the disclosed imaging apparatus, the imaging element driving unit makes an exposure time of each of the plurality of pixels in the first frame period coincide with an exposure time of each of the plurality of pixels in the second frame period.

In the disclosed imaging apparatus, the imaging element driving unit sets the exposure time of each of the plurality of pixels in the first frame period and the exposure time of each of the plurality of pixels in the second frame period to a value that is less than $1/100$ seconds or $1/120$ seconds.

A disclosed flicker detection method comprises: an imaging element driving step of driving a MOS imaging element including a plurality of pixels which are two-dimensionally arranged, using a rolling shutter method, such that the imaging element performs a plurality of imaging operations at an arbitrary frame rate; and a flicker detection step of comparing a first captured image signal which is read from the plurality of pixels for a first frame period based on the frame rate with a second captured image signal which is read from the plurality of pixels for a second frame period based on the frame rate to detect whether a flicker has occurred. In the imaging element driving step, the driving is performed such that an end time of a signal reading period for which a signal is read from the plurality of pixels in the first frame period is before an end time of the first frame period and an end time of the signal reading period in the second frame period coincides with an end time of the second frame period.

In the disclosed flicker detection method, in the imaging element driving step, the driving is performed such that a start time of the signal reading period in the second frame period is after a start time of the second frame period.

In the disclosed flicker detection method, in the imaging element driving step, the driving is performed such that the signal reading period in the second frame period is longer than the signal reading period in the first frame period.

In the disclosed flicker detection method, in the imaging element driving step, the driving is performed such that a start time of the signal reading period in the second frame period coincides with a start time of the second frame period.

In the disclosed flicker detection method, another frame period is present between the first frame period and the second frame period. In the imaging element driving step, for another frame period, the imaging element is driven by the same method as that for the second frame period.

In the disclosed flicker detection method, the second frame period follows the first frame period. In the flicker detection step, the brightness of a signal which has been read from the pixel reset for the first frame period in the second captured image signal is corrected and the corrected second captured image signal and the first captured image signal are compared to determine whether a flicker has occurred.

In the disclosed flicker detection method, the second frame period follows the first frame period. In the imaging element driving unit, the time when a signal is read from a pixel, which has been reset for the first frame period, in the second frame period is controlled such that an exposure time of the pixel coincides with an exposure time of a pixel reset for the second frame period.

In the disclosed flicker detection method, in the imaging element driving step, the imaging element performs a plurality of imaging operations while the first frame period and the second frame period are alternately repeated.

In the disclosed flicker detection method, in the flicker detection step, the second captured image signal read for the second frame period and the first captured image signal read for the first frame period following the second frame period are compared to determine whether a flicker has occurred.

In the disclosed flicker detection method, in the imaging element driving step, an exposure time of each of the plurality of pixels in the first frame period coincides with an exposure time of each of the plurality of pixels in the second frame period.

In the disclosed flicker detection method, in the imaging element driving step, the exposure time of each of the plurality of pixels in the first frame period and the exposure time of each of the plurality of pixels in the second frame period are set to a value that is less than $1/100$ seconds or $1/120$ seconds.

A disclosed flicker detection program causes a computer to perform: an imaging element driving step of driving a MOS imaging element including a plurality of pixels which are two-dimensionally arranged, using a rolling shutter method, such that the imaging element performs a plurality of imaging operations at an arbitrary frame rate; and a flicker detection step of comparing a first captured image signal which is read from the plurality of pixels for a first frame period based on the frame rate with a second captured image signal which is read from the plurality of pixels for a second frame period based on the frame rate to detect whether a flicker has occurred. In the imaging element driving step, the driving is performed such that an end time of a signal reading period for which a signal is read from the plurality of pixels in the first frame period is before an end time of the first frame period and an end time of the signal reading period in the second frame period coincides with an end time of the second frame period.

The invention is particularly applied to, for example, digital cameras and is convenient and effective.

The invention has been described above with reference to a specific embodiment. However, the invention is not limited to the embodiment and various modifications and changes of the invention can be made without departing from the scope and spirit of the disclosed invention. This application is based on JP2015-027594, filed on Feb. 16, 2015, the content of which is incorporated herein by reference.

EXPLANATION OF REFERENCES

5: imaging element
10: imaging element driving unit
11: system control unit
20: flicker detection unit
F1 to F6: frame period
RS: reset signal
RE: read signal
t1 to t8: time

What is claimed is:

1. An imaging apparatus comprising:
a MOS imaging element that includes a plurality of pixels which are two-dimensionally arranged;
an imaging element driving unit that drives the imaging element by a rolling shutter method so that the imaging element performs a plurality of imaging operations at an arbitrary frame rate; and
a flicker detection unit that compares a first captured image signal which is read from the plurality of pixels for a first frame period based on the arbitrary frame rate with a second captured image signal which is read from the plurality of pixels for a second frame period based on the arbitrary frame rate to detect whether a flicker has occurred,
wherein the imaging element driving unit performs the driving so that an end time of a signal reading period for which a signal is read from the plurality of pixels in the first frame period is before an end time of the first frame period and an end time of a signal reading period for which a signal is read from the plurality of pixels in the second frame period coincides with an end time of the second frame period.

2. The imaging apparatus according to claim 1,
wherein the imaging element driving unit performs the driving so that a start time of the signal reading period in the second frame period is after a start time of the second frame period.

3. The imaging apparatus according to claim 1,
wherein the imaging element driving unit performs the driving so that the signal reading period in the second frame period is longer than the signal reading period in the first frame period.

4. The imaging apparatus according to claim 3,
wherein the imaging element driving unit performs the driving so that a start time of the signal reading period in the second frame period coincides with a start time of the second frame period.

5. The imaging apparatus according to claim 4,
wherein another frame period is present between the first frame period and the second frame period, and
the imaging element driving unit drives the imaging element for the another frame period by same method as that for the second frame period.

6. The imaging apparatus according to claim 4,
wherein the second frame period follows the first frame period, and
the flicker detection unit corrects brightness of a signal which has been read from the pixel reset in the first frame period in the second captured image signal and compares the corrected second captured image signal with the first captured image signal to determine whether a flicker has occurred.

7. The imaging apparatus according to claim 3,
wherein the second frame period follows the first frame period, and
the imaging element driving unit controls a time when a signal is read from a pixel, which has been reset in the first frame period, for the second frame period so that an exposure time of the pixel coincides with an exposure time of a pixel reset in the second frame period.

8. The imaging apparatus according to claim 2,
wherein the imaging element driving unit causes the imaging element to perform a plurality of imaging operations while alternately repeating the first frame period and the second frame period.

9. The imaging apparatus according to claim 8,
wherein the flicker detection unit compares the second captured image signal read for the second frame period with the first captured image signal read for the first frame period following the second frame period to determine whether a flicker has occurred.

10. The imaging apparatus according to claim 1,
wherein the imaging element driving unit makes an exposure time of each of the plurality of pixels in the first frame period coincide with an exposure time of each of the plurality of pixels in the second frame period.

11. The imaging apparatus according to claim 1,
wherein the imaging element driving unit sets an exposure time of each of the plurality of pixels in the first frame period and an exposure time of each of the plurality of pixels in the second frame period to a value that is less than $1/100$ seconds or $1/120$ seconds.

12. A flicker detection method comprising:
an imaging element driving step of driving a MOS imaging element including a plurality of pixels which are two-dimensionally arranged by a rolling shutter method, so that the imaging element performs a plurality of imaging operations at an arbitrary frame rate; and a flicker detection step of comparing a first captured image signal which is read from the plurality of pixels for a first frame period based on the arbitrary frame rate with a second captured image signal which is read from the plurality of pixels for a second frame period based on the arbitrary frame rate to detect whether a flicker has occurred, wherein, in the imaging element driving step, the driving is performed so that an end time of a signal reading period for which a signal is read from the plurality of pixels in the first frame period is before an end time of the first frame period and an end time of a signal reading period for which a signal is read from the plurality of pixels in the second frame period coincides with an end time of the second frame period.

13. The flicker detection method according to claim 12, wherein, in the imaging element driving step, the driving is performed so that a start time of the signal reading period in the second frame period is after a start time of the second frame period.

14. The flicker detection method according to claim 12, wherein, in the imaging element driving step, the driving is performed so that the signal reading period in the second frame period is longer than the signal reading period in the first frame period.

15. The flicker detection method according to claim 14, wherein, in the imaging element driving step, the driving is performed so that a start time of the signal reading period in the second frame period coincides with a start time of the second frame period.

16. The flicker detection method according to claim 15, wherein another frame period is present between the first frame period and the second frame period, and in the imaging element driving step, for the another frame period, the imaging element is driven by same method as that for the second frame period.

17. The flicker detection method according to claim 15, wherein the second frame period follows the first frame period, and in the flicker detection step, brightness of a signal which has been read from the pixel reset in the first frame period in the second captured image signal is corrected and the corrected second captured image signal and the first captured image signal are compared to determine whether a flicker has occurred.

18. The flicker detection method according to claim 14, wherein the second frame period follows the first frame period, and in the imaging element driving step, a time when a signal is read from a pixel, which has been reset in the first frame period, in the second frame period is controlled so that an exposure time of the pixel coincides with an exposure time of a pixel reset in the second frame period.

19. The flicker detection method according to claim 13, wherein, in the imaging element driving step, the imaging element performs a plurality of imaging operations while the first frame period and the second frame period are alternately repeated.

20. The flicker detection method according to claim 19, wherein, in the flicker detection step, the second captured image signal read for the second frame period and the first captured image signal read for the first frame period following the second frame period are compared to determine whether a flicker has occurred.

21. The flicker detection method according to claim 12, wherein, in the imaging element driving step, an exposure time of each of the plurality of pixels in the first frame period coincides with an exposure time of each of the plurality of pixels in the second frame period.

22. The flicker detection method according to claim 12, wherein, in the imaging element driving step, the exposure time of each of the plurality of pixels in the first frame period and the exposure time of each of the plurality of pixels in the second frame period are set to a value that is less than $\frac{1}{100}$ seconds or $\frac{1}{120}$ seconds.

23. A non-transitory computer readable storage medium storing a flicker detection program that causes a computer to perform:

an imaging element driving step of driving a MOS imaging element including a plurality of pixels which are two-dimensionally arranged by a rolling shutter method, so that the imaging element performs a plurality of imaging operations at an arbitrary frame rate; and a flicker detection step of comparing a first captured image signal which is read from the plurality of pixels for a first frame period based on the arbitrary frame rate with a second captured image signal which is read from the plurality of pixels for a second frame period based on the arbitrary frame rate to detect whether a flicker has occurred, wherein, in the imaging element driving step, the driving is performed so that an end time of a signal reading period for which a signal is read from the plurality of pixels in the first frame period is before an end time of the first frame period and an end time of a signal reading period for which a signal is read from the plurality of pixels in the second frame period coincides with an end time of the second frame period.

* * * * *